June 23, 1953 R. W. JOHNSON 2,643,061
FUEL CONTROL
Filed Feb. 9, 1950
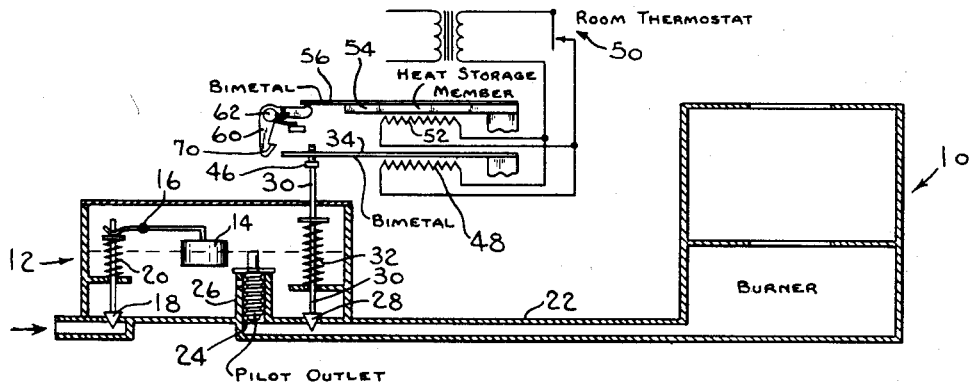
FIG. 1
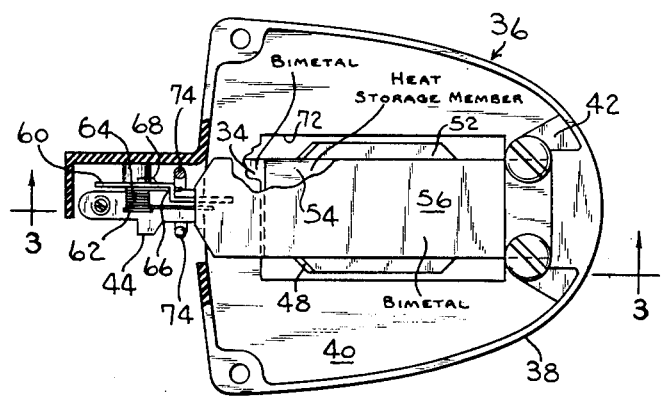
FIG. 2
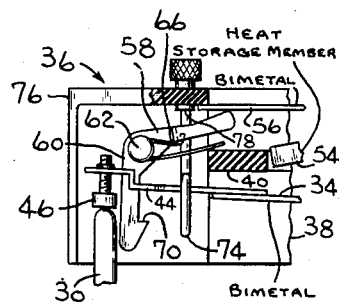
FIG. 4
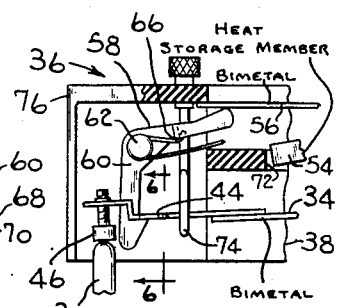
FIG. 5
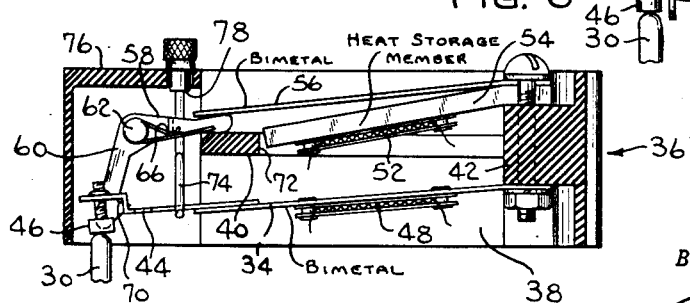
FIG. 3
FIG. 6
INVENTOR.
ROY W. JOHNSON
BY John W. Michael
ATTORNEY Patented June 23, 1953

2,643,061

UNITED STATES PATENT OFFICE 2,643,061

FUEL CONTROL

Roy W. Johnson, Milwaukee, Wis.

Application February 9, 1950, Serial No. 143,251

17 Claims. (Cl. 236—68)

This invention relates to thermostatic regulation of heating units using fluid fuels. More particularly this invention relates to apparatus for obtaining even, comfortable heat under all operating conditions. This invention encompasses the apparatus and the thermostatic system as well as the method of regulating the burner.

An object of this invention is to provide apparatus for automatically regulating heat output of a fluid fuel burner to obtain even, comfortable heat.

Another object is to provide a thermostatically regulated device which eliminates the condition known as "cold seventy."

A further object is to provide for automatic control of a fluid fuel burner to regulate the heat output in accordance with the heating requirements or demand of the day.

Still another object is to provide a thermostatically regulated device for a fluid fuel burner which automatically varies the operating characteristics and heat output to obtain the most desirable heat for the particular day.

A still further object is to provide a novel method of regulating flow to a fluid fuel burner to insure comfortable heat.

Other objects and advantages will be pointed out in, or be apparent from, the specification and claims, as will obvious modifications of the single embodiment shown in the drawings, in which:

Fig. 1 shows the heating system schematically;

Fig. 2 is a top view of the flow control device with the cover plate removed and parts broken away and in section;

Fig. 3 is a side view, partly in section, of the device shown in Fig. 2 when regulating flow at "pilot" condition;

Figs. 4 and 5 are fragmentary views similar to Fig. 3 but showing the "high" and "intermediate" flow positions respectively; and Fig. 6 is a fragmentary view taken on line 6—6 of Fig. 5.

The novelty of this invention and the manner in which the above objects are realized are best understood by reference to the illustrated embodiment of the invention. That this invention is capable of taking other forms will be apparent hereinafter.

Turning to the drawings in detail, Fig. 1 schematically illustrates my invention applied to regulation of oil flow to a conventional pot-type burner 10. The flow from the oil supply (not shown) to the burner passes through and is regulated by constant level chamber 12. Control 12 may be conventional in design but is preferably of the type shown in Patent No. 2,496,214 wherein float 14, pivoted at 16, operates on inlet valve 18 in opposition to spring 20 to maintain a constant level in the chamber. A pilot outlet and a main outlet empty into a common conduit 22 connecting to burner 10. The pilot outlet comprises an adjustable, externally threaded plug 24 fitting snugly in well 26 to cooperate with the wall of the well to provide a capillary bore accurately metering the pilot flow. While this pilot gives superior results it should be understood that this invention is not dependent upon the use of such a pilot. Outlet valve 28 on stem 30 is biased toward its open position by spring 32. Valve movement under the influence of spring 32 is regulated by bimetal 34 in control 36 adapted to be mounted on top of the constant level chamber.

While the bimetal is shown operating on the top of valve stem 30, it should be understood that it is frequently advantageous to have the bimetal operate the valve indirectly through a lever system. The constant level control 12 is, of course, preferably provided with safety devices such as shown in the above-mentioned patent or other safety devices, the exact type and the use or nonuse being of little importance so far as this invention is concerned.

As indicated above, control 36 is adapted to be mounted on top of the constant level device 12 in a position where bimetal 34 may operate on valve stem 30. For this purpose the control 36 includes a base 38 which is secured to the chamber top and additionally serves as a mounting and housing for the component parts of the control. The base includes a horizontal platform 40 and mounting block 42. One end of bimetal 34 is secured to the underside of block 42, and the free end is provided with a member 44 adapted to bear against the upper end of valve stem 30 through the medium of calibrating screw 46. It will be appreciated, therefore, that bimetal 34 operates outlet valve 28 in the constant level chamber. When cool, bimetal 34 occupies the position shown in Fig. 3 wherein valve 30 is closed (screw 46 having been properly adjusted) and the only flow to the burner is through the pilot outlet.

Heater 48 is secured to the underside of bimetal 34 and is adapted to be energized when room thermostat 50 closes. Thus when the thermostat calls for heat the bimetal warps upwardly to the position shown in Fig. 4. This allows spring 32 to open valve 28 and pass fuel for high fire.

It will be noted that another heater 52 is wired in parallel with heater 48 and is simultaneously energized when the thermostat closes. This heater 52 is secured to the underside of a heat storage member 54 (such as a brass bar) having one end mounted on the top of block 42. A second or upper bimetal 56 has one end secured to block 42 and in intimate contact with the end of the heat storage member. Bimetal 56 occupies the position shown in Fig. 3 when it is cool. In this position the free end of the bimetal bears against the upper surface of leg 58 of latch 60 to bias the latch in a counterclockwise direction about pivot 62 carried on the base 38. The latch is biased in a clockwise direction by spring 64 coiled around pivot 62 and having one end engaging the latch arm 58 at 66 and the other end resting on the upper surface of base platform 40. It will be appreciated that when the upper bimetal 56 is heated and warps to the position shown in Fig. 4 spring 64 moves the latch in a clockwise direction to the position shown in Fig. 4.

Member 44 on the tip of bimetal 34 is provided with a laterally projecting ear 68 which is adapted to be engaged by catch 70 on latch 60 when lower bimetal 34 cools and the latch is in the position shown in Fig. 4. This condition is illustrated in Figs. 5 and 6. In this condition bimetal 34 is prevented from closing valve 28 and the fuel flow to the burner is at an intermediate rate.

Before considering the operation of this device a few additional features should be understood. The base platform 40 is provided with a cut-out 72 into which the heat storage member may project to insure free action of the upper bimetal 56 as well as providing for air circulation. The control is provided with means for opening the outlet valve in the event of current failure. This is a simple device comprising a hook 74 depending from base portion 76 and adapted to lift member 44 and bimetal 34 to open the valve. When the bimetal has been raised in this manner it may be retained in position by engaging shoulder 78 on the edge of the hole in base portion 76. When current flow is re-established the hook may be returned to its normal position.

Operation

From the above description it will be appreciated that the float controlled inlet valve 18 maintains a constant oil level in chamber 12. Flow from the chamber to the burner may be by means of the pilot outlet or by the main outlet. As pointed out above, the flow through the pilot outlet is constant at all times. As will be pointed out hereinafter, the more conventional type of control wherein a single outlet valve is employed to meter the pilot flow may be used.

Assuming that the system has been placed into operation and that only pilot flow is taking place, outlet valve 28 is held closed by means of lower bimetal 34. When thermostat 50 calls for heat the circuit is completed and lower heater 48 is energized to warp bimetal 34 upwardly, thus permitting valve 28 to open under the influence of spring 32. Valve 28 now passes fuel for a high fire. Upper heater 52 is also energized when room thermostat 50 closes. This heater heats up the brass bar 54 which, in turn, heats upper bimetal 56 to warp it upwardly and permit latch 60 to swing into its latching position as illustrated in Fig. 4. When the room thermostat is satisfied, both heaters are de-energized and lower bimetal 34 cools off and warps downwardly tending to close valve 28. Since brass bar 54 retains its heat and cools relatively slowly the upper bimetal 56 remains in its upper or warped position so that ear 68 on the lower bimetal will engage with latch 60 and prevent complete closure of valve 28. The fire is now regulated at an intermediate output. One of two conditions may take place at this point. Given sufficient time, upper bimetal 56 will cool to the point where latch 60 is moved counterclockwise out of engagement with ear 68 to permit the lower bimetal to move downwardly and close valve 28. However, if the thermostat calls for heat before the upper bimetal 56 has cooled, the lower bimetal will warp upwardly under the influence of heat from heater 48 to raise the fire to high. It will be appreciated, therefore, that frequent thermostatic demand for heat will result in the fire being regulated between high and intermediate. On the other hand, if the demand is infrequent, the fire will be reduced to pilot between demands.

As will be appreciated by those skilled in the art, the frequency of thermostatic demand for heat varies with different types of thermostats. Thus the anticipator type thermostat calls for heat more frequently than does the conventional thermostat. In order to keep the capacity of upper bimetal heater 52 and the heat storage capacity of the brass bar 54 at a minimum, it is preferred to use the heat anticipator type thermostat since the frequency is greater and the off-period of the thermostatic cycling is shorter. It will be remembered that this type of thermostat has the additional advantage of reducing overshoot and underrun.

On a cold winter day the thermostat calls for heat frequently and the control will regulate the fire in the following manner from a cold start with the pilot ignited. When the thermostat calls for heat, both heaters are energized simultaneously and the lower bimetal warps upwardly to increase the fire to high while the upper bimetal warps to move the latch 60 into its engaging position (Fig. 4). Upon satisfaction of the thermostat the circuit is broken and both heaters are de-energized. Since the upper bimetal cools slower than the lower bimetal, the latch will engage the lower bimetal as it cools and moves downwardly to reduce the fire. Thus the lower bimetal is latched at an intermediate fire position (Fig. 5). Since the heat demand of the day results in frequent thermostatic demand, the thermostat will call for heat and the lower bimetal will warp upwardly to increase the fire to high before the upper bimetal can cool sufficiently to unlatch the lower bimetal. This cycle of operation will be repeated throughout a cold winter day. It will be apparent that the fire never goes to pilot and a continuous but variable heat flows into the heated space when the heat demand or requirement of the day is high. This completely eliminates the condition known as "cold seventy" which arises when there is no heat flow into the room and the air has had time to stratify.

On a very mild day thermostatic demand for heat will, of course, increase the fire to high in the manner set forth above. Upon satisfaction of the demand for heat the fire will be reduced to an intermediate level. However, since the heat demand of the day is low and thermostatic cycling is infrequent, the thermostat will fail to call for heat before the lower bimetal is unlatched and the fire reduced to pilot. When the thermostat finally does call for heat the fire will be increased from pilot to high as before. On such mild days "cold seventy" does not present a problem and it is desirable that the fire be reduced to pilot during the "off" cycle of the thermostat. It will be appreciated that the maintenance of the fire at an intermediate level during the "off" cycle of the thermostat would cause serious overheating of the space on a mild day.

There are many days in spring and fall when the heat demand in the morning and evening is high and is reduced in the hours around midday as the solar heat is felt. On such days this control will cycle the fire between high and intermediate in the early morning and in the evening but will reduce the fire to pilot (after passing through intermediate at the end of each thermostat demand) during the "off" cycles of the thermostat around midday. It will be appreciated, therefore, that this control may be said to be responsive to the heat demand of the day as distinguished from thermostatic demand for heat. So far as is known there is no control capable of providing continuous but variable heat when such heat is desirable and providing substantially on-off operation when such operation becomes desirable.

Since the rate of heating the brass bar or heat storage member 54 and the amount of heat stored in the brass bar during each "on" cycle can be designed for almost any condition, it will be apparent that this invention is not limited to use with an anticipator thermostat. The rate of heating the brass bar and the upper bimetal 56 could be regulated so that the operating or lower bimetal would be latched only after a demand for heat of a predetermined duration, but it has been found preferable to make the upper heater 52 of such capacity as to insure latching operation after any demand found in practice. The length of time upper bimetal 56 remains warped to permit latching action is, of course, dependent upon the amount of heat stored in the brass bar 54. This in turn depends to some extent upon the duration of the thermostatic demand.

As pointed out above, the schematically illustrated constant level chamber 12 with the separate pilot outlet need not be employed. The same fundamental principles apply and operating characteristics obtain where the lower or valve operated bimetal 34 is provided with stops limiting the valve closing movement of the bimetal to a point providing a metering pilot flow past the outlet valve.

It has been found that this control regulates the heat output of the burner to maintain an even, comfortable heat under all conditions. On those days where the heat demand is high (and this may be defined as being and the control correspondingly designed for any climatic condition desired) the heat characteristics of this control are superior to any known system.

This same broad invention may be applied to control of gas flow to a burner as shown and described in the co-pending application of Roy W. Johnson et al., Serial No. 160,268. Similarly this broad invention may be used in a device for regulating oil flow to a burner provided with electric ignition mechanism in place of or supplementary to the pilot oil flow as may be seen in the co-pending application of Roy W. Johnson et al., Serial No. 237,332. It will be appreciated that the present structure could readily be modified so that the valve operating bimetal is latched on the way to its high fire position and retained in the latched position until the upper bimetal warps downwardly to unlatch the valve operator and permit the fire to go to high. This system may be used in conjunction with pot-type burners which require considerable preheating before being capable of handling fuel for high fire. As thus modified the control permits only an increase in the fire to intermediate until the pot is hot enough to receive full fuel flow.

The latching may be done by the bimetal per se rather than having the bimetal operate a separate latch. Many other forms will occur to those skilled in the art. All such forms are considered to be within the spirit of this invention. As will be apparent the operating parts need not necessarily be bimetals. Other forms are shown in said applications and still others will occur to the art. Accordingly the claims are not to be limited to the illustrated mechanism. This invention is to be limited only by the scope of the claims.

I claim:

1. A fuel flow control comprising, a thermostat, a valve operator, means responsive to thermostat closure to move said valve operator to a high position to increase fuel flow to a high rate and responsive to opening of said thermostat to move said operator to another position to decrease fuel flow to a predetermined point, bimetallic latch means operable when heated to engage said operator and arrest operator movement at a third position between said high and said other position, and heater means for said latch means regulated by said thermostat to heat said latch means when said thermostat closes, and means for retarding movement of said latch means from its operative position when said thermostat opens so the operator is arrested at said third position for a period of time.

2. The control according to claim 1 in which said retarding means comprises heat storage means exclusive of said heater means and heated by said heater means and operable to store heat and retard cooling of said bimetallic latch means when said thermostat opens.

3. A control according to claim 2 in which said heat storage means comprises a metallic member heated by said heater means and mounted in conductive relationship to said latch means.

4. A thermostatically regulated fuel flow control for regulating movement of a flow control valve, comprising, a thermostat, a valve operator biased to a first position, means responsive to thermostat closure to move said operator to a high flow position, normally inoperative latch means movable to an operative position in which said latch means is adapted to engage and retain said operator at a position intermediate said first and said high positions as the operator moves from said high position when the thermostat opens, means responsive to closure of said thermostat to move said latch means to said operative position and operable for a period of time after said thermostat opens to retain said latch means in said operative position to engage and retain said operator for a period of time at said intermediate position as the operator moves toward said first position when the thermostat opens.

5. A control according to claim 4 in which said latch means comprises bimetallic means adapted to be warped to said operative position when heated, and said latch means moving means includes, a heater energized upon closure of said thermostat, and a heat storage member associated with said heater and said bimetallic means to retard cooling of said bimetallic means when said thermostat opens and said heater is de-energized.

6. A thermostatic control comprising, in combination, a valve operator biased to a low position and movable to a high position, electrically energized means for moving said operator to said high position, motion arresting means biased to an inactive position and movable to an active position wherein said arresting means is adapted to stop movement of said operator to said low position, electrically energized means for moving said arresting means to said active position, a thermostat, an electric circuit including said thermostat and both of said electrically energized means, closure of said thermostat causing simultaneous energization of both of said electrically energized means, and means for retarding movement of said arresting means to its inactive position upon opening of said thermostat so the arresting means is operable for a period of time to stop movement of said operator toward said low position when said thermostat opens.

7. A control according to claim 6 in which said arresting means comprises bimetal means, said electrically energized means for said arresting means comprises a heater, and said movement retarding means comprises a metallic member heated by said heater and operable to retard cooling of said bimetal means upon de-energization of said heater when said thermostat opens.

8. A thermostatic control comprising, in combination, a thermostat, an electrically energized valve operator biased to a low position and movable to a high position in response to a demand for heat by said thermostat, electrically energized means regulated by said thermostat and operable to arrest movement of said operator to said low position at an intermediate position upon satisfaction of the demand for heat, and means moving the arresting means to an inoperative position within a period of time following satisfaction of the heat demand and in absence of a new demand.

9. A fuel flow control comprising, a thermostat, an electrically energized valve operator regulated by said thermostat and occupying a low flow position when cool and adapted to move to a high flow position when energized, electrically energized latch means regulated by said thermostat and operable when energized to engage said operator at a position intermediate said low and said high positions to arrest operator movement, said operator and said latch means being energized and deenergized simultaneously, and means retarding movement of said latch means to its inoperative position upon deenergization of the latch means and the operator so the operator is engaged at said intermediate position for a period of time by said latch means following said deenergization.

10. A thermostatic control comprising, in combination, a thermostat, a valve operator regulated by said thermostat and movable from a low flow position to a high flow position when the thermostat calls for heat, means operable to arrest movement of the operator at an intermediate position upon satisfaction of the heat demand, and means regulated by said thermostat for rendering said arresting means inoperative at the end of a period of time following the satisfaction of the heat demand and in absence of a new demand for heat within the period.

11. A thermostatic control comprising, in combination, a thermostat, a valve operator regulated by said thermostat and movable from a low flow position to a high flow position when the thermostat calls for heat, means operable to arrest movement of the operator at an intermediate position upon satisfaction of the heat demand, and means rendering said arresting means inoperative at the end of a period of time following satisfaction of the heat demand and in absence of a new demand within the period.

12. A thermostatic control comprising, in combination, a valve operator biased to a low position and movable to a high position, a thermostat, a heat motor regulated by said thermostat for moving said operator to said high position when the thermostat calls for heat, means operable to arrest movement of the operator at an intermediate position upon satisfaction of the heat demand, and means for limiting operation of said arresting means to a period of time following satisfaction of the heat demand in absence of a new demand within the period.

13. A thermostatic control comprising, in combination, a valve operator biased to a low position and movable to a high position, a thermostat, a heat motor regulated by said thermostat for moving said operator to said high position when the thermostat calls for heat, means operable upon satisfaction of thermostatic demand for heat for arresting movement of said operator at an intermediate position, and means operable in absence of a new demand for heat within a period of time to permit said valve operator to move to said low position.

14. A thermostatic control comprising, in combination, a valve operator biased to a low position and movable to a high position, a thermostat, a heat motor regulated by said thermostat for moving said operator to said high position when the thermostat calls for heat, latch means adapted to arrest movement of the valve operator toward said low position at an intermediate position, means for moving said latch means to its operative position where said thermostat calls for heat and for maintaining the latch means in said operative position for a period of time following satisfaction of the heat demand, said valve operator being released by said latch means for movement to said low position in absence of a new demand for heat in said period.

15. A fuel control comprising, a thermostat, a bimetallic valve operator occupying a low position when cool and adapted to warp to a high position when heated, an electric heater for said operator, bimetallic latch means inoperative when cool and operative when heated to engage said operator at a position intermediate said low and said high positions to arrest operator movement, and a heater for said bimetallic latch means, both of said heaters being connected in circuit with said thermostat for simultaneous energization, said latch means remaining in its operative position for a period of time after being heated and deenergized so as to engage said operator at said intermediate position as the operator moves towards said low position upon being deenergized.

16. In the control set forth in claim 15, heat storage means heated by said latch means heater and operable to store heat and retard cooling of said latch means when said thermostat opens.

17. A control according to claim 16 in which said heat storage means comprises a metallic member heated by said latch means heater, said member being mounted in heat conductive relationship to said latch means.

ROY W. JOHNSON.

References Cited in the file of this patent
UNITED STATES PATENTS

| Number | Name | Date |
|---|---|---|
| 1,700,428 | Breese | Jan. 29, 1929 |
| 2,353,464 | Hayter et al. | July 11, 1944 |
| 2,364,591 | Stoughton et al. | Dec. 5, 1944 |
| 2,369,739 | Johnson et al. | Feb. 20, 1945 |
| 2,470,572 | Miller et al. | May 17, 1949 |
| 2,586,826 | Jones et al. | Feb. 26, 1952 |